United States Patent [19]

Numakura et al.

[11] Patent Number: 4,924,323
[45] Date of Patent: May 8, 1990

[54] TONAL CONVERSION METHOD FOR PICTURES

[75] Inventors: Takashi Numakura; Iwao Numakura, both of Tama, Japan

[73] Assignee: Yamatoya & Co., Ltd., Tokyo, Japan

[21] Appl. No.: 347,620

[22] Filed: May 5, 1989

[30] Foreign Application Priority Data

May 13, 1988 [JP] Japan ................. 63-114599

[51] Int. Cl.$^5$ ............................................. H04N 1/40
[52] U.S. Cl. .................................... 358/456; 358/298
[58] Field of Search ............... 358/456, 455, 458, 467, 358/298, 300; 382/54

[56] References Cited

U.S. PATENT DOCUMENTS 4,680,646 8/1984 Ikede et al. ........................ 358/298
4,701,807 10/1987 Ogimo ................................. 358/456
4,717,964 1/1988 Abe et al. ............................ 358/456
4,736,253 4/1988 Shida ................................... 358/456
4,811,108 3/1989 Numakura et al. ................. 358/298

OTHER PUBLICATIONS

J. A. C. Yule "Principles of Color Reproduction", pp. 110-111, John Wiley & Sons (1967).

Primary Examiner—Edward L. Coles, Sr.

[57] ABSTRACT

Upon production of a reproduced picture from an original picture having a standard or non-standard, tonal conversion of the original picture is conducted based on pictorial information from the original picture. The information is processed in such a way that the base density information datum of a desired control point on the original picture and the halftone intensity at a corresponding control point on the reproduced picture are correlated in accordance with a specific conversion formula.

10 Claims, 4 Drawing Sheets

TONAL CONVERSION METHOD FOR PICTURES

FIELD OF THE INVENTION

This invention relates to a tonal conversion technique useful upon production of hard pictures such as printed pictures and soft pictures such as PCT (video) pictures (transient images displayed optically) [which will hereinafter be called "reproduced pictures" collectively] from original pictures such as paintings, monochrome pictures, color pictures or any other objects, namely, to a novel method for the tonal conversion of an original picture upon production a reproduced picture from the original picture. The term "picture" as used herein should be interpreted in a broad sense so that it may embrace not only pictures themselves but also images.

BACKGROUND OF THE INVENTION

It is the present state of art that no basic technique has yet been established to permit conversion of an original picture into a reproduced picture with good reproducibility in gradation and tone (hereinafter called "quality") in the tonal conversion of the original picture for the production of the reproduced picture from the original picture.

In other words, in the reproduction of the original picture quality in the reproduced picture, the "nonlinear conversion technique in the density range of a picture" which may be considered to form a basis for the reproduction is dependent totally on experiences and perception of an operator and is thus non-scientific and non-rational.

The term "nonlinear conversion technique in the density range of the picture" (hereinafter called the "conversion technique in the density range of the picture" or merely the "tonal conversion technique of the picture") means a technique which is fundamentally different in field from image processing in the spatial range, image processing in the spatial frequency range, image processing of a given picture by a statistical method, and processing techniques for pictorial characteristics of a given picture such as pattern analyses. It rather provides a basic technique for these image processing technology.

Because, it is the crux, basis and fundamental of the tonal conversion of a picture upon production of a reproduced picture that irrespective of the characteristics of the original picture and irrespective of the technical details or means therefor, the quality of the original picture be converted at the ratio of 1:1 and the quality of the resultant reproduced picture has a suitable density gradient whereby the reproduced picture is felt natural to the visual sensation of man.

However, the present conversion techniques in the density range of a picture (tonal conversion techniques for pictures) are totally dependent on the experiences and perception of man. Moreover, no attempt has been made to improve these techniques to rational and scientific ones. Accordingly, conventional machines, equipment and components for obtaining reproduced pictures on the basis of any of such conventional tonal conversion techniques for pictures as well as conventional systems using in combination two or more of such conventional machines, equipment and components cannot provide reproduced pictures with good reproduction of the quality of original pictures. In addition, their constructions are unnecessarily complex and sophisticated, leading to problems in manufacturing costs, ease and convenience in use, repair, maintenance, etc.

These problems can be attributed primarily to the fact that no tonal conversion technique for a picture, which permits scientific and rational reproduction of the quality of the original picture at the ratio of 1:1 in a reproduced picture, has yet been established as the above-mentioned basic technique in the conversion technology for pictures.

Referring to specific tonal conversion techniques for pictures, this matter will be discussed to a some extent.

(i) Production of printed pictures:

(a) When plate-making work is not standardized, especially, when a printing plate is made using as an original picture a photographic color film picture having non-standard quality (for example, over-exposed or under-exposed color film picture), there is no rational method to cope with the irregularity in quality and the plate-making work has to be conducted depending fully on the experiences and perception of man. A major reason for the lack of development of a scientific approach in this field is the presence of an excuse preventing the search for a rational technique, that is, artistic elements or aspects which inherently accompany printed materials.

(b) If one wants to stabilize the quality of products to increase the productivity of the plate-making work, the construction of a scanner as a plate-making apparatus becomes more complex and more expensive. Moreover, the operation of the scanner becomes more difficult. Thus, a great deal of labor is required for the education and training of its operators.

(c) Even if such a sophisticated and complicated scanner is introduced, 30-40% of color separation work has to be done over again for spoilage or other reasons.

(ii) The more the image processing function is sophisticated, the more the processing speed is increased and/or the more the flexibility to the function is imparted in digital image processing apparatus such as a color copier or in a digital image processing software, the constructions of the software and hardware becomes progressively complex. This results in an increased manufacturing cost and in contrast, in a reduction of flexibility. Further, the reduction of a software to a hardware is rendered more difficult.

(iii) In luminescent pictures such as TV pictures, there is a strong demand for the good reproduction of quality. There is another demand for the development of a simple method for the adjustment of quality. For the manual adjustment of the quality of TV pictures, complex adjustment procedures are required with respect to the brightness, contrast, and the three colors (R, G and B). An automatic control system requires a complex construction and leads to a higher manufacturing cost. Nevertheless, it is the current circumstances that fully satisfactory reproducibility of quality has not attained yet.

(iv) Upon taking a picture in a low illuminance range (dark field) which is a typical example of invisible ranges to the visual sensation of man, a time-related limitation is imposed on the photographing conditions by the moving speed of the object. Even if one tries to eliminate the time-related limitation by a simple amplifier means or the like, it is difficult to obtain a vivid picture excellent in the reproduction of the quality.

OBJECT AND SUMMARY OF THE INVENTION

The present inventors has had the basic recognition that as the problem common to all conventional techniques for the tonal conversion in the density range of an original upon production of a reproduced picture from the original picture, the conversion processings of the picture are dependent completely on the experiences and perception of man.

An object of this invention is therefore to improve the technique, which is adapted for the tonal conversion in the density range of an original upon production of a reproduced picture from the original picture, from that relying upon the experiences and perception of man to a scientific and rational technique.

In summary, the present invention relates to a method for conducting tonal conversion of an original picture based on pictorial information from the original picture upon production of a reproduced picture from the original picture, which comprises converting the base density information datum (x) of a desired control point on the original picture into a halftone intensity (y) at a corresponding control point on the reproduced picture in accordance with the following formula (1):

$$y = y_H + \frac{\alpha(1 - 10^{-kx})}{\alpha - \beta}(y_S - y_H) \quad (1)$$

where x: the base density information datum of the desired control point on the original picture, which is a value obtained by subtracting the density at the brightest area of the original picture from the density at the desired control point of the original picture;

y: the halftone intensity at the corresponding control point on the reproduced picture;

$y_H$: a desired halftone intensity set for the brightest area of the reproduced picture;

$y_S$: a desired halftone intensity set for the darkest area of the reproduced;

$\alpha$: the surface reflectivity of a base material on which the reproduced picture is to be formed;

k: $\gamma$/the density range of the original picture, $\gamma$ being a predetermined factor; and $\beta$: a value determined from the value $\gamma$, which determines k above, in accordance with $\beta = 10^{-\gamma}$.

DETAILED DESCRIPTION OF THE INVENTION

Figure 1:
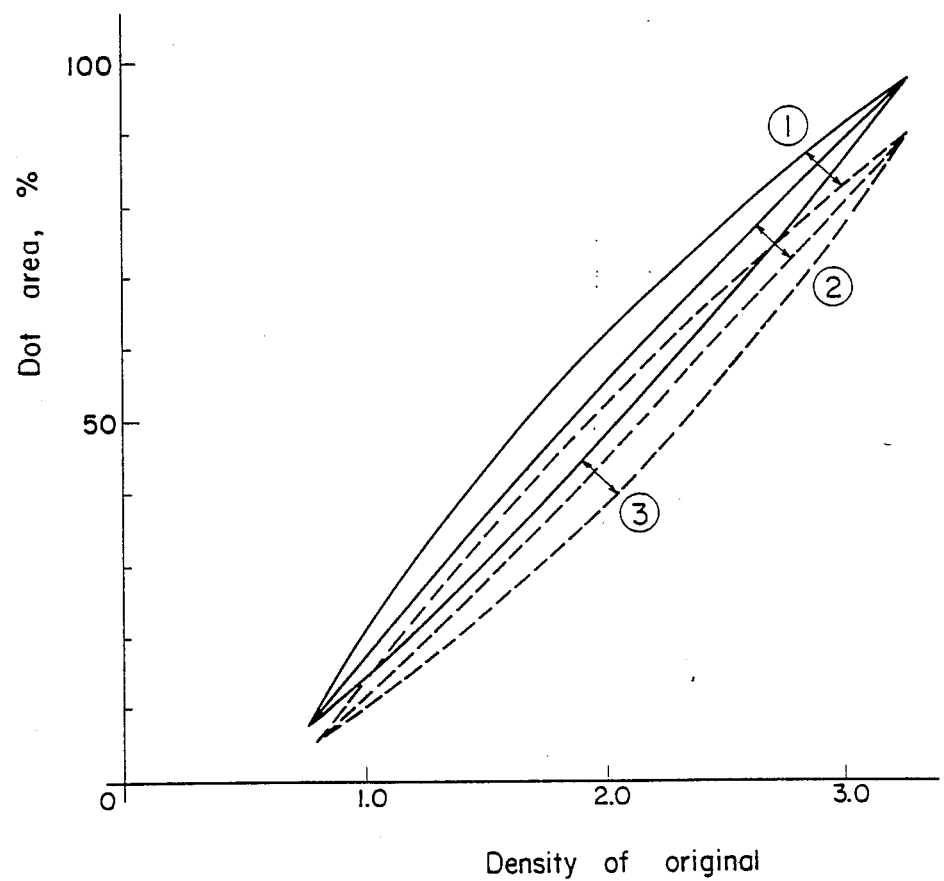
FIG. 1 is a schematic illustration of a rational processing method for an under-exposed color original in multicolor plate-making work.

Features of the present invention will hereinafter be described in detail.

The present inventors have already proposed a tonal conversion method suitable for use upon production of reproduced pictures such as printed pictures (U.S. patent application Ser. No. 166,101).

In the above application, the present inventors have proposed to conduct tonal conversion work of a picture in accordance with a scientifically- and theoretically-derived tonal conversion formula in order to avoid the dependency on the experiences and perception of man from the tonal conversion technique for the picture.

The technical details of the present invention have been obtained by generalizing the tonal conversion technique proposed previously. Accordingly, the process which led to the development of the tonal conversion formula useful in the tonal conversion proposed previously is also believed to be useful for the better understanding of the technical details of the present invention.

Therefore, a description will firstly be made of the process in which the previously-proposed tonal conversion formula useful for the tonal conversion of a picture upon production of a reproduced picture such as a printed picture was derived. To distinguish the formula (1) derived in this invention, the previously-proposed tonal conversion formula will hereinafter be called "the formula (2)". Further, as already described above, the previously-proposed formula (2) is useful not only in the formation of a picture to be printed but also in the formation of a picture to be recorded by any of various printers, copying machines and the like. For the sake of convenience, the process will be described referring to the formation of a picture to be printed by way of example.

It has been well known that upon production of a printed material, the conversion of the tone of an original picture from continuous tone to halftone is indispensable when a halftone picture is produced from an original picture such as a color photograph by a photo-mechanical camera or the like or the color separation work of a photographic color original is conducted by an electronic color separation apparatus (e.g., monochrome scanner or color scanner).

When conducting the tonal conversion, the following facts must be kept in mind.

There are two basic elements expressing or visualizing the printed picture, i.e., "dot areas" and "the reflection density of an ink". Regarding "the reflection density of the ink", it has been known empirically that in order to conduct printing while reproducing dots in a high-light area H and a shadow area S on a printing plate correctly on a sheet of printing paper, namely, in order to perform adequate printing, the amount of the ink must be controlled within about ±10% relative to an appropriate ink amount on a printing machine (in the case of a black plate, the amount of an ink may be controlled within a range as wide as about ±20% in some instances so as to improve the quality of the picture or black characters or letters.). From experiences, it has been known that the visual sensation of man can easily distinguish a difference as small as 1% between "dot area" percentages as a density difference and the accuracy of the visual sensation is hence superior to densitometers. It has also been known empirically that the area at the same dot may vary by a degree as much as several tens percentages in a plate-making or printing operation. The ability of changing the quality (gradation and tone) of a printed picture by changing the amount of an ink at a desired group of dots (dot arrangement) is far smaller that the ability of changing the quality of the printed picture by changing the size of dots at a given ink coat weight. In view of these objective facts and empirical rules, it is readily understood that the control of the area of each dot is extremely important in the production of a printed picture as a halftone picture.

The importance of control of the dot size is appreciated in view of the fact that a slightest change (5-10 μm) in dot diameter leads to an appreciable change to the picture quality, in other words, gives influence to the visual sensation of man. It is also understood easily that variations in dot size are greater than the above-mentioned variations in "the reflection density of a printing ink" as shown in the following table.

Diametrical Variations of Dot and
Degrees of Deviations from Standard Dot Area
(Rates of increases and decreases of dot area
as calculated based on the standard dot)
(Unit of dot diameter: 1/100 mm)

| −1/100 mm | −0.5/100 mm | Dot diameter | +0.5/100 mm | +1/100 mm |
|---|---|---|---|---|
| 55.56% | 30.56% | 3 | 36.11% | 77.78% |
| 36.00% | 19.00% | 5 | 21.00% | 44.00% |
| 30.56% | 15.97% | 6 | 17.36% | 36.11% |
| 26.53% | 13.78% | 7 | 14.80% | 30.61% |
| 20.99% | 10.80% | 9 | 11.42% | 23.46% |
| 17.36% | 8.88% | 11 | 9.30% | 19.01% |
| 15.97% | 8.16% | 12 | 8.51% | 17.36% |
| 14.79% | 7.54% | 13 | 7.84% | 15.98% |
| 12.89% | 6.56% | 15 | 6.78% | 13.78% |
| 10.80% | 5.48% | 18 | 5.63% | 11.42% |
| 9.30% | 4.71% | 21 | 4.82% | 9.75% |
| 8.16% | 4.12% | 24 | 4.21% | 8.51% |
| 7.02% | 3.54% | 27 | 3.60% | 7.27% |

Note:
The above figures are all theoretical values. The following equations were employed.
(a) When the dot size became larger:

Rate of increase of dot area = $\{(S_p)^2 - S^2\} \times \frac{1}{S^2}$

S: Diameter of the standard dot
$S_p$: Diameter of the enlarged dot
(b) When the dot size became smaller:

Rate of decrease of dot area = $\{S^2 - (S_m)^2\} \times \frac{1}{S^2}$

S: Diameter of the standard dot
$S_m$: Diameter of the reduced dot

In relation to the matter mentioned above, photomechanical plate-making work involves the following background characteristics. Namely, original pictures have a wide variety of quality and details. The step for the formation of a printed picture, which follows the photomechanical plate-making work, is diversified and moreover, each of such diversified kinds of printed-picture forming steps has its own work characteristics. Base materials such as printing paper sheets and color materials such as printing inks, which are both used to express or visualize pictures to be printed, have various properties. Furthermore, the quality evaluation standard for printed pictures varies from one orderer for prints to another.

In order to absorb and overcome such complex and unstable factors involved in the photomechanical plate making work and printing work, it is therefore essential to provide means for allowing to choose the smallest dot ($Y_h$) at the brightest area and the largest dot ($Y_s$) at the darkest area in a halftone picture to be produced (to be printed) as desired upon conversion of a continuous-tone picture into a halftone picture and further for allowing to rationally and easily set and control the tones of a picture, said tones ranging from the brightest area to the darkest area, to desired tones.

Based on the foregoing view, the present inventors theoretically derived the below-described formula (2) in such a manner that it conforms with the practice of plate-making work. Here, it is to be noted that the below-described formula (2) employed upon production of a printed picture may look at first glance similar to the formula (2) useful in this invention but important differences exist in the meanings or values of the individual terms. Leaving the description of these differences to a subsequent part, the process in which the formula (2) was derived will be described further.

Formula (2)

$$y = y_H + \frac{\alpha(1 - 10^{-kx})}{\alpha - \beta}(y_S - y_H) \quad (2)$$

where x: the base density information datum of the desired control point X on the original picture, which is a value obtained by subtracting the density at the brightest area of the original picture from the density at the desired control point of the original picture;

y: the halftone intensity of the corresponding control point Y on the picture to be reproduced;

$y_H$: a desired halftone intensity set for the brightest area of the picture to be reproduced;

$y_S$: a desired halftone intensity set for the darkest area of the picture to be reproduced;

α: the reflectivity of a base material on which the halftone picture is to be reproduced;

β: the surface reflectivity of a medium for visualizing the halftone picture; and k: the ratio of the density range of the halftone picture to be reproduced to the density range of the original picture.

The above-described conversion formula (2), which is useful in determining dot area percentages (y) upon production of a printed picture, was derived from the density formula (photographic density, optical density) accepted widely, namely, D = log $I_o/I$ = log 1/T where $I_o$: intensity of incident light,
I: intensity of light reflected or transmitted, and
T = $I/I_o$ = reflectivity or transmittance.

The above general formula for the density D may be applied to plate-making and printing in the following manner.

Density (D′) in plate-making and printing = log $I_o/I$ = log (unit area × reflectivity of paper)/{(unit area − dot area) × reflectivity of paper + dot area × surface reflectivity of ink} = log $\alpha A/[\alpha\{A - (d_1 + d_2 + \ldots + d_n)\} + \beta(d_1 + d_2 + \ldots d_n)]$ where A: the unit area,
$d_n$: the area of each dot in the unit area,
α: the reflectivity of the printing paper, and
β: the surface reflectivity of the printing ink.

In the present invention, the density formula (D′) for plate-making and printing was incorporated with the above-described requirement for the maintenance of correlation between the base density information datum (x) of a desired control point on a picture and the dot area percentage (y) of the dot at the corresponding control point on a resulting halftone picture, whereby the conversion formula (2) has been derived so as to bring a theoretical value into substantial conformity with its corresponding value measured actually.

When the formula (2) is applied to a tonal conversion method of a picture upon production of a printed picture, the above formula (2) is used to determine the value (y) of the dot area percentage of the dot at a control point (Y) on a picture, which is to be printed, from the base density information datum (x) of a corresponding control point (X) on an original picture while freely selecting the sizes ($y_H, y_S$) of dots desired to be placed in the high-light area H and shadow area S of the picture, which is to be printed, on the basis of the values of the reflectively ($\alpha$) of printing paper, the surface reflectivity ($\beta$) of a printing ink, and the ratio (k) of the density range of the printed picture to the density range of the original picture. It is accordingly possible to reproduce the density gradation of the original picture with fidelity at the ratio of 1:1 on the printed picture.

In the case of multicolor plate-making (the four plates, namely, cyan plate (C), magenta plate (M), yellow plate (Y) and black plate (BL) are generally considered to make up a unit), once the standard work characteristic curve of a base plate [in the case of multicolor plate-making, the cyan plate (C) serves as a base plate as known very well in the art], namely, the standard halftone characteristic curve for converting the density of an original picture into a halftone area percent of a printed picture is determined, the standard work characteristic curves of the other color plates can always be determined rationally by multiplying the value y of the base plate with appropriate adjustment values which are based respectively on the gray balance ratios of the corresponding individual printing inks. Moreover, all of the work characteristic standard curves thus determined for the individual color plates are of course rational characteristic curves and moreover, the mutual relationship in gradation and tone among these characteristic curves is also rational and appropriate. So long as the tonal conversion of a picture is conducted in accordance with the formula (2), the adjustment and control of the gradation and tone of a picture to be printed in accordance with a multicolor printing technique can be effected rationally.

The present inventors have already made the following proposal. By using the formula (2) obtained as described above, it is possible to get rid of the conventional tonal conversion method which relies upon experiences and perception, and hence to perform the tonal conversion of a picture as desired and in a rational manner. As a consequence, rational conversion is also feasible with respect to the tone which is related closely and unseparably to the gradation, and a printed picture having a density gradient and a tone natural to the visual sensation of a man can be obtained.

However, the existence of certain limitations to the actual use of the formula (2) was found in a subsequent investigation.

Namely, the formula cannot be applied satisfactorily where an original picture has non-standard quality, especially, extremely poor quality (for example, a color film original over- or under-exposed upon its photographying).

Describing this from the standpoint of application and operation of the formula (2), where an original picture has standard quality, namely, is a color film original subjected to appropriate exposure and development, the formula is effective when the density (typically, 0.9–1.0) of an area printed solid with a yellow ink having a large stimulus value out of printing inks is used as the numerator of k. However, the formula cannot fully satisfy especially when it is applied to the above-described original of poor quality.

Further, the formula cannot be applied with full satisfaction to the above-described original of non-standard quality when the surface reflectivity of a printing ink (a yellow ink being used as a standard) or other value is chosen and used as desired.

The present inventors proceeded with an investigation with a view toward developing a method applicable satisfactorily to the above-described original picture of non-standard quality, namely, a method for obtaining a printed picture of well-balanced density gradation even if the original picture has poor quality. As a result, it was found that the formula (2) must be used under the following conditions:

k: $\gamma$/the density range of the original picture;

$\gamma$: a desired positive or negative value; and $\beta$: a value obtained from the value $\gamma$ defining the above value k, in accordance with $\beta = 10^{-\gamma}$.

By using the formula (2) under the above conditions, printed pictures excellent in the reproduction of density gradation can be produced from an original picture of standard quality and an original picture of non-standard quality respectively.

In other words, the setting of the above conditions can improve the formula (2), which was proposed previously by the present inventors, into the formula (1) which is applicable for tonal conversion upon production of a printed picture with good quality reproduction from an original picture irrespective of the quality of the original picture.

Needless to say, the formula (1) can be obtained by incorporating the above conditions into the formula (2) and then simplifying the resultant formula.

The meaning of each term of the formula (1) useful in the practice of this invention and its characteristics in use and applications will next be described.

Upon using the formula (1) derived in this invention, any density information datum can be used so long as it reflects a physical value pertaining to the density of each picture element of an original picture, which as described above is not necessarily limited to a color picture original upon production of a printed picture. The term "density information datum" should therefore be interpreted in a broadest sense. Synonyms may include reflected density, transmitted density, luminance, intensity, light quantity, amplitude, current value, voltage value, etc. It is only necessary to obtain them as density information signals, for example, by scanning the original picture photoelectrically.

Incidentally, when a value measured by a densitometer (for example, a density of 0.3–2.80 in the case of a portrait on a positive color film) is used as the base density information datum (x) and percentages (for example, values such as 5% or 95%) are used as $y_H$ and $y_S$, the halftone intensity (y) is calculated in terms of percentage.

Upon application of the formula (1) in accordance with this invention, it is free to use the formula (1) by modifying it as desired, to say nothing of its modification as follows:

$$y = y_H + E(1 - 10^{-k\eta})(y_S - y_H)$$

where $$E = \frac{1}{1-\beta} - \frac{1}{1-10^{-\gamma}}$$

In the above modification given by way of example, α is assumed to be 1 (α=1). This means that the surface reflectivity, for example, of a printing paper (base material) to be used to express or visualize the picture to be printed is set at 100%. As the value of α, any desired value may be chosen as will be appreciated from Table 1. From the practical viewpoint, it may be set at 1.0. This also applies to luminance pictures such as video pictures.

The tonal conversion method of this invention for pictures, which relies upon the formula (1), is extremely useful for the reproduction of the gradation and tone of an original picture, namely, for reproducing the quality of the original picture at the ratio of 1:1 in a picture to be reproduced. It is to be noted that its usefulness is not limited to such an application. In addition to the high-fidelty reproduction of the quality of an original picture, the formula (1) derived in the present invention is also extremely useful for the rational tonal change or modification of the quality of an original picture by suitably selecting the values α, β, k, r, $y_H$ and $y_S$. The tonal conversion method of this invention has an extremely high degree of flexibility. In this invention, the

TABLE 1

| | | Examples of α, β, γ and α(1-β)/(α-β) Values | | | | | | | | |
|---|---|---|---|---|---|---|---|---|---|---|
| | | α | | | | | | | | |
| γ | β | 2.0 | 1.5 | 1.0 | 0.9 | 0.8 | 0.7 | 0.6 | 0.5 | 0.1 |
| 3.0 | 0.0010 | 0.9995 | 0.9997 | 1.0000 | 1.0001 | 1.0003 | 1.0004 | 1.0007 | 1.0010 | 1.0091 |
| 2.0 | 0.0100 | 0.9550 | 0.9966 | 1.0000 | 1.0011 | 1.0025 | 1.0044 | 1.0068 | 1.0102 | 1.1100 |
| 1.5 | 0.0316 | 0.9839 | 0.9892 | 1.0000 | 1.0036 | 1.0082 | 1.0142 | 1.0223 | 1.0338 | 1.4162 |
| 1.2 | 0.0631 | 0.9674 | 0.9780 | 1.0000 | 1.0075 | 1.0171 | 1.0297 | 1.0470 | 1.0722 | 2.5387 |
| 1.0 | 0.1000 | 0.9474 | 0.9643 | 1.0000 | 1.0125 | 1.0286 | 1.0500 | 1.0800 | 1.1250 | — |
| 0.9 | 0.1259 | 0.9328 | 0.9542 | 1.0000 | 1.0163 | 1.0374 | 1.0658 | 1.1062 | 1.1683 | −3.3749 |
| 0.8 | 0.1585 | 0.9139 | 0.9409 | 1.0000 | 1.0214 | 1.0494 | 1.0878 | 1.1436 | 1.2320 | −1.4387 |
| 0.5 | 0.3162 | 0.8122 | 0.8664 | 1.0000 | 1.0542 | 1.1307 | 1.2472 | 1.4458 | 1.8604 | −0.3162 |
| 0.1 | 0.7943 | 0.3412 | 0.4372 | 1.0000 | 1.7517 | 29.0100 | −1.5263 | −0.6350 | −0.3494 | −0.0296 |
| −0.1 | 1.2589 | −0.6988 | −1.6111 | 1.0000 | 0.6493 | 0.4514 | 0.3243 | 0.2358 | 0.1706 | 0.0223 |
| −0.5 | 3.1622 | 3.7208 | 1.9512 | 1.0000 | 0.8602 | 0.7323 | 0.6147 | 0.5063 | 0.4061 | 0.0706 |

According to the above exemplary modification (α=1.0), $y_H$ and $y_S$ can be set respectively for the brightest area H and the darkest area S on the printed image as intended. This is evident from the fact that x becomes 0 (x=0) in the brightest area H and the density range of the original picture [x = the density range of the original picture]in the darkest area S on the original picture, namely, $$k_x = \gamma \cdot \frac{[\text{the density range of the original picture}]}{[\text{the density range of the original picture}]} = \gamma$$

hence, $$-k_x = -\gamma.$$

Figure 2:
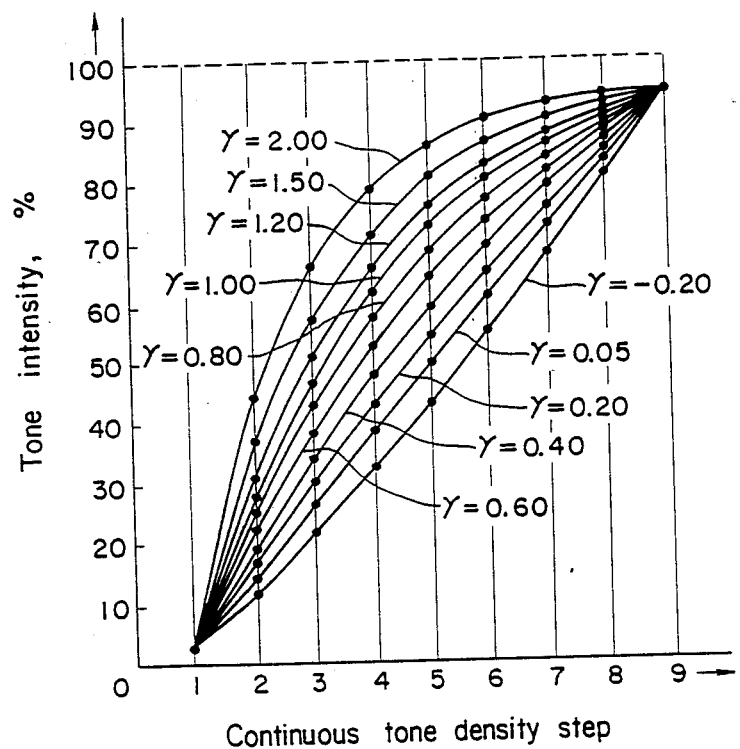
FIG. 2 is a diagrammatic illustration of a relationship between values $\gamma$ and variations in shape of characteristic curves for color separation.

Upon application of the above formula (1) derived in this invention, α, β, k, γ which defines the value of β by the value k and $10^{-\gamma} = \beta$, and $$\epsilon = \frac{\alpha(1-\beta)}{\alpha - \beta}$$

can take various values as shown in Table 1. In this invention, tonal conversion of an original picture can be conducted rationally irrespective of the quality of the original picture by suitably choosing these values. For example, when $y_T$ and $y_S$ in a printed picture are set at desired values and the value γ is changed (assume α=1 0), the standard work characteristic curves for multi-color plate making work, namely, the color-separation characteristic curves (which may also be called "halftone characteristic curves) shown in FIGS. 1 and 2 are obtained. As will be described subsequently, FIG. 1 gives a rational solution to the question how a color-separation characteristic curve should be set to achieve good reproduction of density gradation where an original picture is under-exposed.

term "tonal conversion of a picture" should be interpreted in such a broad sense.

Namely, upon application of the formula (1), a user (worker) should keep in mind that it has the following freedoms:

Freedom 1

The formula (1) can be used to obtain a printed picture conforming with its corresponding original picture very well. Namely, the formula (1) can be applied while giving the priority to the provision of a printed picture which looks exactly the same as the original picture to the eye of a man. Such a manner of tonal conversion of a picture is described by the term "tonal conversion (of a picture)" in this invention.

Freedom 2

The formula (1) can be used to change or modify an original picture to obtain printed pictures in light of needs from the viewpoint of photomechanical plate-making and printing techniques, artistic demands, orderers' needs, etc., whereby printed pictures can be obtained. Namely, the formula (1) can be applied while giving the priority to the provision of a visual picture in a form changed (or modified) when observed through the eye of a man. Such a manner of tonal conversion of a picture is described by terms "tonal change (modification) (of a picture)" in this invention.

In the conversion work of the tone of an original continuous-tone picture upon production of a halftone picture, which is to be printed, from the original continuous-tone picture in accordance with this invention, the above-mentioned tonal conversion or change (modification) can be achieved with ease, specifically, by changing the $y_h$, $y_s$, k value, α, β and ε value suitably in the conversion formula (1).

The tonal conversion method of this invention has been described taking the production of a halftone picture, which is to be printed, from an original picture of continuous tone by way of example. The application field of the present invention is however not limited to the printing field.

The tonal conversion method making use of the formula (1) derived in this invention is effective when one wants to reproduce a picture of non-continuous tone, such as a binary picture or a multivalued picture, from an original picture of continuous tone by relying upon an expression mode such as changes in halftone, i.e., dots or the concentration or luminance of each unit picture element. Namely, the tonal conversion method can of course be applied effectively to the following case:

(i) When it is desired to show a gradation or tone by changing the size of each dot as seen in printed pictures as described above in detail, such as letterpress, lithography, halftone gravure and silk screen pictures (this method is called "variable-area gradation method").

The tonal conversion method of this invention can also be applied effectively to the following cases.

(ii) When it is desired to show a gradation or tone by changing the intensity of a pigment or dye (coloring material), like a printing ink, to be caused to adhere per picture element (for example, per dot), which has a uniform area, as seen in fusion-transfer type thermal transfer pictures, (silver-salt utilized) thermally-developed transfer pictures and conventional gravure pictures (this method is called "variable-density gradation method").

(iii) When it is desired to show a gradation by changing the recording density per unit area, for example, the number of dots, the number and/or size of ink droplets, or the like as seen in pictures produced by a digital copying machine (color copies, etc.), printer (ink-jet type, bubble-jet type, or the like) or facsimile [this method is similar to the variable-area gradation method (i)].

(iv) When it is desired to obtain a CRT picture from video signals, TV signals or high-definition TV signals by adjusting the level of luminance of each unit picture element, or to obtain a halftone print or hard copy from the CRT picture.

(v) In addition to the tonal conversion of an original picture into a reproduced picture in substantially the same density (luminance and illuminance) range, when photographing is conducted in a range invisible from the standpoint of space, luminance, wavelength or time, for example, when pictorial information is inputted and converted in a low illuminance range where there is a large difference in density range between an original picture and a reproduced picture because of an extremely low contrast of the original picture (photographing by a high-sensitivity camera, or the like)—(in such a case, an emphasis is placed on the exaggeration conversion of the contrast of the picture rather than the tonal conversion of the picture).

(vi) When a diagnostic X-ray picture of poor quality is subjected to tonal conversion to achieve a correct diagnosis or to avoid any false diagnosis (this is not limited to X-ray pictures but applies to all diagnostic pictures in general).

(vii) Besides, the tonal conversion method of this invention can be applied to densitometers equipped with a density and tone conversion system to display a tone area percent and the like along with a density, printing-related equipment such as simulators for advance testing of color separation (for example, color proofing simulators) and simulators for the education of color separation, etc.

Upon application of the tonal conversion method of this invention, which uses the formula (1), in the various application fields described above, it is only necessary to subject pictorial information and/or electrical pictorial information signals, which may be either analog or digital signals, relating to the density obtained from an original continuous-tone picture (including a hard original and a soft original) to tonal conversion at a picture processing unit (tonal conversion unit) of an equipment in each of the various application fields described above, and then to control the current or voltage level in the recording portion (recording head) of the equipment or the impression time or the like in accordance with the thus-processed value, i.e., $\gamma$ value (tonal intensity) to change the number of dots per unit area (per picture element), the density per given area (for example, 1 dot) or the like, thereby making it possible to output a reproduced halftone or like picture having a density gradation corresponding to the original picture at the ratio of 1:1.

For example, to make an original plate for a printed picture which is a halftone picture, namely, an original printing plate by using the tonal conversion method of this invention which is based on the formula (1), it is only necessary to use a conventional system known well in the present field of art. The above plate-making work can be achieved by incorporating a software, which can perform the tonal conversion method of this invention, in a commercial color-separation and halftone scanning system such as an electronic color separation apparatus (color scanner or total scanner) to practise.

Described more specifically, as the conventional system, may be mentioned a system for making an original printing plate by exposing an original picture, which is a continuous-tone picture such as a color photograph, to a spot light of a small diameter, receiving at a photoelectric conversion unit (photocell) light (a pictorial information signal) reflected by or transmitted through the original picture, processing the thus-obtained electrical signal (electrical value) of pictorial information by a computer as needed, controlling an exposing light source based on a processed electrical signal (voltage) of pictorial information outputted from the computer, and then exposing a blank film to a laser spot light. It is thus only necessary to incorporate a software capable of converting electrical signals of continuous-tone pictorial information into electrical signals of halftone pictorial information by using the formula (1) of this invention, for example, in a computerized processing unit of the above system, said unit being adapted to process electrical signals of pictorial information of the original picture. Such a software may take any one of various forms such as a general purpose computer storing an algorithm of the formula (1) derived in this invention as a software and having an I/F (interface) for A/D (analog-digital conversion) and D/A, an electric circuit embodying the algorithm as a logic by a general purpose IC, an electric circuit with a ROM containing results computed in accordance with the algorithm, a PAL, gate array or custom IC with the algorithm embodied as an internal logic, etc. Reflecting the recent development of modularization in particular, a computing system capable of performing tonal conversion of a picture in its density range on the basis of the formula (1) derived in this invention can be easily fabricated as a module of a special-purpose IC, LSI, microprocessor, microcomputer or the like. An original printing plate of a halftone gradation having the dot area percent (value y) derived by the formula (1) can be easily made by causing a photoelectrically-scanning spot light to advance successively as discrete spots and operating a laser exposing unit in unison with the scanning.

The tonal conversion of this invention in the density range of a picture is usually performed in the course of conversion of inputs. It can however be performed in any stage such as conversion of outputs, recording, transmission, processing or display.

ADVANTAGES OF THE INVENTION

The present invention has made it possible to scientifically and rationally perform tonal conversion in the density range of an image or picture in the first step of processing of an original picture, namely, tonal conversion of the original picture, thereby bringing about the following advantages:

(1) Conventional techniques for the tonal conversion of a picture, said techniques being dependent on experiences and perception of man and having been responsible for the instability and confusion in the production technology and product quality, namely, techniques for the conversion of the gradation and tone of a picture and those for their change, modification, adjustment and control can be replaced by scientific and rational techniques respectively.

(2) It has become possible to standardize tonal conversion techniques for a picture, namely, all techniques such as conversion of the gradation and tone of a picture and their change, modification, adjustment and control.

This invention has therefore brought about significant contributions to the improvements and stabilization of of techniques, productivity, costs and quality. Described specifically, the following contributions may be mentioned:

(i) Scanners and simulators can be simplified in system, thereby making it possible to reduce their manufacturing costs.

Currently-available scanners require as essential components a computation system for enciphering color-separation characteristic curves and halftone characteristic curves determined based on the experiences and perception of man - such as an electronic computer - and a memory for these characteristic curves. The present invention permits omission or simplification of such computation system and memory.

(ii) This invention has made it unnecessary to determine color-separation characteristic curves and halftone characteristic curves themselves, the determination of which has heretofore been an essential operation in a plate-making process for the formation of a picture to be printed, requires substantial time and labor and is hence cumbersome and costly.

(iii) This invention has also made it unnecessary to perform proofing work which is generally considered essential for any process available presently for the formation of a picture to be printed.

In addition, high-quality products can be obtained stably without using an image-forming simulator which is now considered indispensable or convenient.

(iv) Upon formation of printed pictures, the present invention has made it possible to always provide good products stably by the same procedure within the same working time irrespective whether an original picture has standard or non-standard quality.

Owing to this advantage, the plate-making time can be shortened significantly and the materials can also be saved. Redoing which reaches as high as 30–40% in conventional techniques can be reduced at least to 5%, thereby bringing about a considerable improvement to the efficiency of plate-making work.

(v) This invention allows to stably obtain pictures, such as printed pictures, having quality, i.e., gradation and tone which can always be felt appropriate and natural by the visual sensation of man.

(3) The training and education of all processing techniques for pictures can be improved into scientific and rational ones.

(4) In all processing techniques for pictures, routine work such as conversion, modification, adjustment and control of the characteristics, gradation and contrast of each picture can be performed rationally and scientifically in a standardized manner as designed.

(5) When photographing a picture in such a low illuminance range that generally results in a low-contrast picture, it has been necessary to set the shutter speed slower to obtain more photons for a high contrast. This invention has however eliminated this limitation, so that a vivid picture can be obtained irrespective of the moving speed of an object even in such a low illuminance range.

(6) In the architecture of an IC, LSI or the like for the process of pictorial information, the design of an computing circuit for the pictorial information can be simplified rationally and its function can also be improved with ease In tonal conversion of a picture at least in its density range, the above advantage allows to design a simpler processing software for digital images or the like while improving the function. This facilitates the reduction of a software into a hardware and hence lowers the software cost significantly.

(7) By adopting the technique of this invention in combination with equipment such as simulator, densitometer and the like for the processing of picture information, the function of the equipment can be improved whereby the importance and roles of these equipment in an image processing system can be rendered more consistent with the technical level of the overall system.

(8) All image processing equipment can be rationally simplified in both construction and system, so that their handling can be facilitated substantially.

EMBODIMENTS OF THE INVENTION

This invention will hereinafter be described in more detail on the basis of certain examples. It should however be borne in mind that the present invention is not limited to or by the following examples so long as the essential features thereof are not departed.

Example 1

As one embodiment of this invention, first of all, a description will be made of tonal conversion of a picture in the course of formation of a picture to be printed, which is a representative example of tonal conversion techniques in the density range of the picture.

A printed color picture may be mentioned as a representative example of printed pictures. Tonal conversion of a picture in the course of formation of its color print is performed by a procedure which determines a standard color-separation characteristic curve for color-separation work in the color-separation step of the multi-color plate-making work. The standard color-separation characteristic curve may also be called a "standard halftone characteristic curve".

In a plate-making operation, a color scanner is used and based on color-separation characteristic curves, a halftone picture to be printed by means of four color printing plates is formed as a reproduced picture on a photographic film from a color photographic picture of continuous gradation as an original picture. The color printing plates consist of four plates which are yellow (Y) plate, magenta (M) plate, cyan (C) plate and black (BL) plate. The color photographic picture will hereinafter be called simply a "color original". The halftone picture is either a negative or positive picture and will hereinafter be called simply a "picture to be printed by color plates". The quality of a picture to be printed is determined by the quality of the picture on a proof sheet which is formed from the picture to be printed by color plates, namely, from the halftone positive or negative picture by way of a proofing operation.

In this example, a positive color film of 4"×5" wide was used as a color original (EK Ekuta Chrome), "DC-360ER" (trade name) manufactured by HELL Corporation as a color scanner, and the Du Pont's Cromalin process as a proofing process. Upon using the formula (1) derived in the present invention, the value α was set at 1 and as the value γ, there was used a value selected to obtain a color-separation characteristic curve for a yellow ink of a density printed solid or for a desired color. Further, "PC-9800" manufactured by NEC Corp. was used as a means for performing computation in accordance with the formula (1). In order to perform computation in accordance with the formula (1), "PC-9800" was loaded with a software such that the input of a density value of a color original measured by a densitometer would provide a base density and the advance input of densities measured at the brightest area (H) and darkest area (S) of a color original, desired area percents of dots to be placed at the corresponding H and S areas on a picture to be printed by color printing plates and a value γ would permit the conversion of the density measured at a desired point on the color original into the halftone area percent at the corresponding point on the picture to be printed by the color printing plates.

Further, upon setting a necessary color-separation characteristic, a gray scale having a linear density gradient was placed alongside the color original as a guide for the color separation work as in conventional processes so that the original picture and gray scale were subjected to color separation at the same time. The image processing system was also connected to a printer to print out pictorial information as needed.

(i) First of all, an experiment was conducted to apply the formula (1) to a color separation operation color originals of standard quality to ascertain its effects.

For this purpose, four color originals of standard quality different in density range, object and photographing environment were used as original pictures. As values γ for the C plate which would serve as a standard for a picture to be printed, were used 1.00 and 0.90 which are the densities of yellow inks—representative printing inks—as printed solid. On the other hand, γ=0.65 was chosen for both Y plate and M plate. However, in Experiment 2 (γ=0.90) to be described subsequently, the value γ of the Y plate was set at 0.50 to make the dot area of the Y plate smaller by about 3% compared to standard Y plates.

The results of those Experiment (1)-(4) are summarized in Table 2.

TABLE 2

Experimental Data for Setting Color-Separation Characteristic Curve (C plate) for Color Originals of Standard Quality

| Experiment (1) Still life, indoor | | | Experiment (2) Lady in bathing outfit, outdoor beach | | | Experiment (3) Lady in Japanese clothes, indoor | | | Experiment (4) Lady in western clothes, indoor | | |
|---|---|---|---|---|---|---|---|---|---|---|---|
| Density of color original | Dot area % (3–95) | | Density of color original | Dot area % (3–95) | | Density of color original | Dot area % (3–93) | | Density of color original | Dot area % (3–98) | |
| | $\gamma = 1.00$ | $\gamma = 0.90$ | | $\gamma = 1.00$ | $\gamma = 0.90$ | | $\gamma = 1.00$ | $\gamma = 0.90$ | | $\gamma = 1.00$ | $\gamma = 0.90$ |
| 0.200 | 3.0000 | 3.0000 | 0.200 | 3.0000 | 3.0000 | 0.270 | 3.0000 | 3.0000 | 0.200 | 3.0000 | 3.0000 |
| 0.525 | 28.5664 | 27.0190 | 0.519 | 28.5664 | 27.0190 | 0.599 | 28.0106 | 26.4968 | 0.500 | 29.4001 | 27.8022 |
| 0.850 | 47.7384 | 45.5566 | 0.838 | 47.7384 | 45.5566 | 0.928 | 46.7659 | 44.6315 | 0.800 | 49.1973 | 46.9444 |
| 1.175 | 62.1155 | 59.8638 | 1.156 | 62.1155 | 59.8638 | 1.256 | 60.8304 | 58.6277 | 1.100 | 64.0432 | 61.7181 |
| 1.500 | 72.8967 | 70.9060 | 1.475 | 72.8967 | 70.9060 | 1.585 | 71.3772 | 69.4298 | 1.400 | 75.1760 | 73.1204 |
| 1.825 | 80.9815 | 79.4283 | 1.794 | 80.9815 | 79.4283 | 1.914 | 79.2863 | 77.7668 | 1.700 | 83.5244 | 81.9205 |
| 2.150 | 87.0443 | 86.0057 | 2.113 | 87.0443 | 86.0057 | 2.243 | 85.2172 | 84.2012 | 2.000 | 89.7484 | 88.7124 |
| 2.475 | 91.5907 | 91.0821 | 2.431 | 91.5907 | 91.0821 | 2.571 | 89.6648 | 89.1672 | 2.300 | 94.4795 | 93.9453 |
| 2.800 | 95.0000 | 95.0000 | 2.750 | 95.0000 | 95.0000 | 2.900 | 93.0000 | 93.000 | 2.600 | 98.0000 | 98.0000 |
| Proof sheets of satisfactory quality were obtained at both $\gamma = 1.00$ and $\gamma = 0.90$. | | | Results were as expected although lots of intermediate tone were rendered fewer at $\gamma = 0.90$ in Y plate only. A picture having an appropriate and natural density gradient was obtained. | | | Proof sheets of satisfactory quality were obtained at both $\gamma = 1.00$ and $\gamma = 0.90$. | | | Same as Experiment (3). The color-separation work had regularity, thereby permitting rationalization of plate-making work. | | |

As shown in Table 2, it has been demonstrated that the formula (1) derived in this invention is a scientific and rational means for the tonal conversion of a picture in its density range, which can obtain halftones of desired $y_H$ and $y_S$ at the H and S areas of a picture to be printed by color printing plates and can provide a reproduced picture of quality reflecting correctly the quality of an original picture having standard quality. It has also been confirmed that the tonal conversion method of the picture in its density range can be standardized easily.

(ii) Next, another experiment was conducted using as an original picture a color original having non-standard quality, namely, a dark color original photographed under such under-exposure conditions that the color original would not be usable as an original for usual plate-making and printing work (density range of the original: 0.700–3.400). Namely, the rationality of the formula (1) was investigated by conducting a color separation operation in accordance with the formula (1) to form a proof sheet and then evaluating the quality of the picture of the proof sheet. Since the quality of the color original employed in this experiment was extremely poor, proof sheets were formed under the following three conditions respectively, and the qualities of their pictures were investigated:

Experiment No. 1: Color-separation characteristic curve for Y and M plates were set substantially linear. Regarding $\gamma$ values, $\gamma_C = 0.35$ and $\gamma_{Y,M} = 0.10$.

Experiment No. 2: Color-separation characteristic curve for C plate was set substantially linear. Regarding $\gamma$ values, $\gamma_C = 0.10$ and $\gamma_{Y,M} = -0.18$.

Experiment No. 3: Curve obtained for Y and M plates in Experiment No. 2 was used a a color separation characteristic curve for C plate. Regarding $\gamma$ value, $\gamma_C = -0.18$ and and $\gamma_{Y,M} = -0.45$.

To achieve good gray balance and color balance in the pictures to be printed by the color printing plates, compared to $y_H = 3\%$ and $y_S = 95\%$ of the C plate, the dot area percents of the Y and M plates were set smaller by 1% in the H areas, by 5% in the S areas and by about 10% in the intermediate tone areas. The results of those experiments are given in Table 3.

ment No. 1. ②and ③ indicate similar relations in Experiment Nos. 2 and 3 respectively.

It is understood from these results that Experiment No. 2 and Experiment No. 3 were able to provide proof sheets whose pictures had bright quality sufficient for actual use.

Incidentally, Table 3 also shows as Experiment No. 4 the results of a further color-separation experiment, in which in order to obtain a proof sheet which had brightness between those of the pictures obtained in Experiment Nos. 2 and 3 respectively, namely, which was brighter about ⅔ times from the brightness of the picture obtained in Experiment No. 2 toward the brightness of the picture obtained in Experiment No. 3, the value $\gamma$ for the C plate was set at the value obtained by subtracting the value (the $\gamma$ value of No. 2 - the $\gamma$ value of No. 3) × ⅔ from the $\gamma$ value of No. 2, i.e., $0.10 - \{0.10 - (-0.18)\} \times \frac{2}{3} \approx -0.10$. As readily envisaged from Table 3, the quality of the picture of the proof sheet obtained in Experiment No. 4 was satisfactory as expected.

It has been confirmed by those experiments that the formula (1) can be applied effectively by standardized procedures even in the tonal conversion of an original picture of non-standard quality in its density range provided that the value $\gamma$ is adjusted as needed. Through those experiments, it has also been found that the adjust-

TABLE 3

Basic Experimental Data for Determination of Color-Separation Characteristic Curves for Under-Exposed Color Originals (See FIG. 1)

| Density of Color Original | Exp. No. | | | |
|---|---|---|---|---|
| | 1 | 2 | 3 | 4 |
| | Characteristic of Curve | | | |
| | Y,M plates- almost linear $\gamma_c = 0.35$ $\gamma_{Y,M} = 0.10$ | C plate- almost linear $\gamma_c = 0.10$ $\gamma_{Y,M} = 0.18$ | C plate- Y,M plates of No. 2 $\gamma_c = -0.18$ $\gamma_{Y,M} = -0.45$ | C plate- C plates (Nos. 2-3) × ⅔ $\gamma_c = -0.10$ $\gamma_{Y,M} = -0.37$ |
| 0.700 | 3.0000 | 3.0000 | 3.0000 | 3.0000 |
| 1.038 | 18.9337 | 15.6912 | 12.5256 | 13.3754 |
| 1.375 | 33.3405 | 28.0224 | 22.5577 | 24.0537 |
| 1.713 | 46.3666 | 40.0037 | 23.1233 | 35.0439 |
| 2.050 | 58.1445 | 51.6450 | 44.2506 | 46.3549 |
| 2.388 | 68.7937 | 62.9561 | 55.9697 | 57.9963 |
| 2.725 | 78.4224 | 73.9463 | 68.3119 | 69.9776 |
| 3.063 | 87.1283 | 84.6246 | 81.3104 | 82.3088 |
| 3.400 | 95.0000 | 95.0000 | 95.0000 | 95.0000 |
| Quality of picture on proof sheet | Dark | Good | A little too bright | Good |

Note:
(1) "Y, M and C plates" mean their respective color-separation characteristic curves.
(2) Correlation among Y, M, C and black plates follows a usual method.

The color-separation characteristic curves employed therein are shown in FIG. 1, in which solid curves indicate color-separation characteristic curves employed respectively for C plates in Experiments Nos. 1–3 and dashed curves indicate color-separation characteristic curves used respectively for Y and M plates in Experiment Nos. 1–3. In each of the experiments, the same color-separation characteristic curve was used for both Y and M plates. The combination of the solid curve and dotted curves both indicated by ① in the drawing indicates the relation between the color-separation characteristic curve for C plate and that for Y and M plates, said curves having been used in Experiment or modification of the tone of a picture can be rationally carried out as desired by standardized procedures by understanding characteristics of tonal conversion of an original picture in its density range and using Table 1. It should be noted that Table 1 contains certain illustrative values only.

(iii) As has become clear from the experiments described above, it is the $\gamma$ value that can substantially change the shape of a color-separation characteristic curve defined by the formula (1) derived in this invention. This aspect will therefore be confirmed by other data. It is Table 4 that shows how value y (halftone intensity, %) would change for various $\gamma$ values.

TABLE 4

Correlation between γ Value and y Value

| Step | \multicolumn{9}{c}{γ Value} | | | | | | | | |
|------|------|------|------|------|------|------|------|------|-------|
|      | 2.00 | 1.50 | 1.20 | 1.00 | 0.80 | 0.40 | 0.20 | 0.05 | −0.20 |
| 1 | 3.00 | 3.00 | 3.00 | 3.00 | 3.00 | 3.00 | 3.00 | 3.00 | 3.00 |
| 2 | 43.67 | 36.31 | 31.67 | 28.56 | 25.48 | 22.48 | 19.62 | 16.94 | 15.08 | 12.32 |
| 3 | 66.54 | 57.94 | 51.98 | 47.73 | 43.34 | 38.38 | 34.43 | 30.11 | 27.00 | 22.19 |
| 4 | 79.37 | 71.95 | 66.31 | 62.07 | 57.49 | 52.63 | 47.60 | 42.50 | 38.71 | 32.61 |
| 5 | 86.63 | 81.10 | 76.53 | 75.89 | 68.80 | 64.28 | 59.40 | 54.27 | 50.32 | 43.72 |
| 6 | 90.70 | 87.03 | 83.73 | 80.98 | 77.75 | 74.05 | 69.89 | 65.34 | 61.73 | 55.46 |
| 7 | 92.98 | 90.87 | 88.82 | 87.02 | 84.84 | 82.24 | 79.21 | 75.77 | 72.94 | 67.85 |
| 8 | 94.27 | 93.37 | 92.43 | 91.57 | 90.49 | 89.16 | 87.55 | 85.65 | 84.03 | 81.01 |
| 9 | 95.00 | 95.00 | 95.00 | 95.00 | 95.00 | 95.00 | 95.00 | 95.00 | 95.00 | 95.00 |

Note:
(1) The numbers in the table indicate y values (tonal intensity, %) in the respective density steps.
(2) The tonal intensities set for H and S are all 3% and 95%, respectively.

In Table 4, under the conditions of $y_H=3\%$, $y_S=95\%$, $\alpha=1.00$, $\beta=10^{-\gamma}$ and k=γ/(density range of original picture) =γ/(2.8−0.2), the value y was calculated in accordance with the formula (1) while changing the value γ. Table 4 thus shows y values for the individual density steps (in Table 4, the density range of the original picture is divided into 9 steps.).

When value γ is changed, the corresponding color-separation characteristic curve can be obtained from Table 4. It is hence only necessary to conduct tonal conversion by setting an optimal γ value in view of the quality of each given original picture. The results of Table 4 are diagrammatically illustrated in FIG. 2.

Example 2

It has been substantiated by Example 1 that color-separation characteristic curves, which constitute the most important part of color separation work, can be obtained rationally by applying the formula (1) derived in this invention, especially by setting suitable γ values conforming with the quality of an original picture.

Accordingly, a description will next be made of a method for the rational determination of γ values. In this Example, a discussion will be made firstly on conditions for rationally forming proof sheets of pictures having desired quality and tone from plural sheets of color originals of different qualities by standardized procedures.

In Example 2, the possibility was therefore investigated whether the evaluation of the quality of a color original, which depends fully on the experiences and perception of a scanner operator especially under the current technology, more specifically, the determination of a density characteristic curve ranging from the H area to the S area of the color original can be performed by a rational technique instead of the operator experiences and perception. Based on the findings obtained from the above investigation, a further investigation was also conducted with a view toward establishing a method for setting optimal color-separation characteristic curves for each color original.

The significance of those investigations will be described. Objective information of a density characteristic curve ranging form the H area to the S area of a color original provides fundamental data for rationally conducting color-separation work.

However, as known very well, the density characteristic curve of each color original varies widely depending on the maker, kind and type of the film and photographing conditions, especially, depending on the quantity of exposing light upon photographing the color original. It may extend linearly (where the exposure is appropriate), may curve upwards (where the light for exposure is insufficient) or may curve downwards (where the light for exposure is too much). Needless to say, the shape of each density characteristic curve gives direct influence to the tone and quality of the picture of a proof sheet.

It is therefore extremely important to know the shape of the density characteristic curve of each color original by a rational method before its color-separation work.

From two color originals obtained by photopraphing the same object at different exposure levels, proof sheets were respectively prepared by conducting their color separation in accordance with color-separation characteristic curves determined by the formula (1).

Color Original No. 1:
The exposure was slightly over, the tone of the picture was slightly bright, and the density range of the picture was 0.17 to 2.750.

Color Original No. 2:
The exposure was appropriate. The picture had standard quality, and its density range was 0.21 to 2.95.

In this Example, to ascertain the flexibility of the method for-applying the formula (1) and also to develop from various facets a method for the rational judgement of the above density characteristic curves, Color Original No. 1 was subjected to color separation daringly in accordance with a standard color-separation characteristic curve, namely, by setting the γ for C plate at 1.0. Accordingly, the picture of the resultant proof sheet had quality which was felt somewhat bright like the tone of the color original. On the other hand, Color Original No. 2 which was darker in tone than Color Original No. 1 but had standard quality as described above was also subjected to color separation in such a way that the picture of the resulting proof sheet would have quality comparable with the quality of the picture of the proof sheet of the Color Original No. 1, in other words, would have a bright tone. Data of the experiment are shown in Table 5.

TABLE 5

Figure 3:
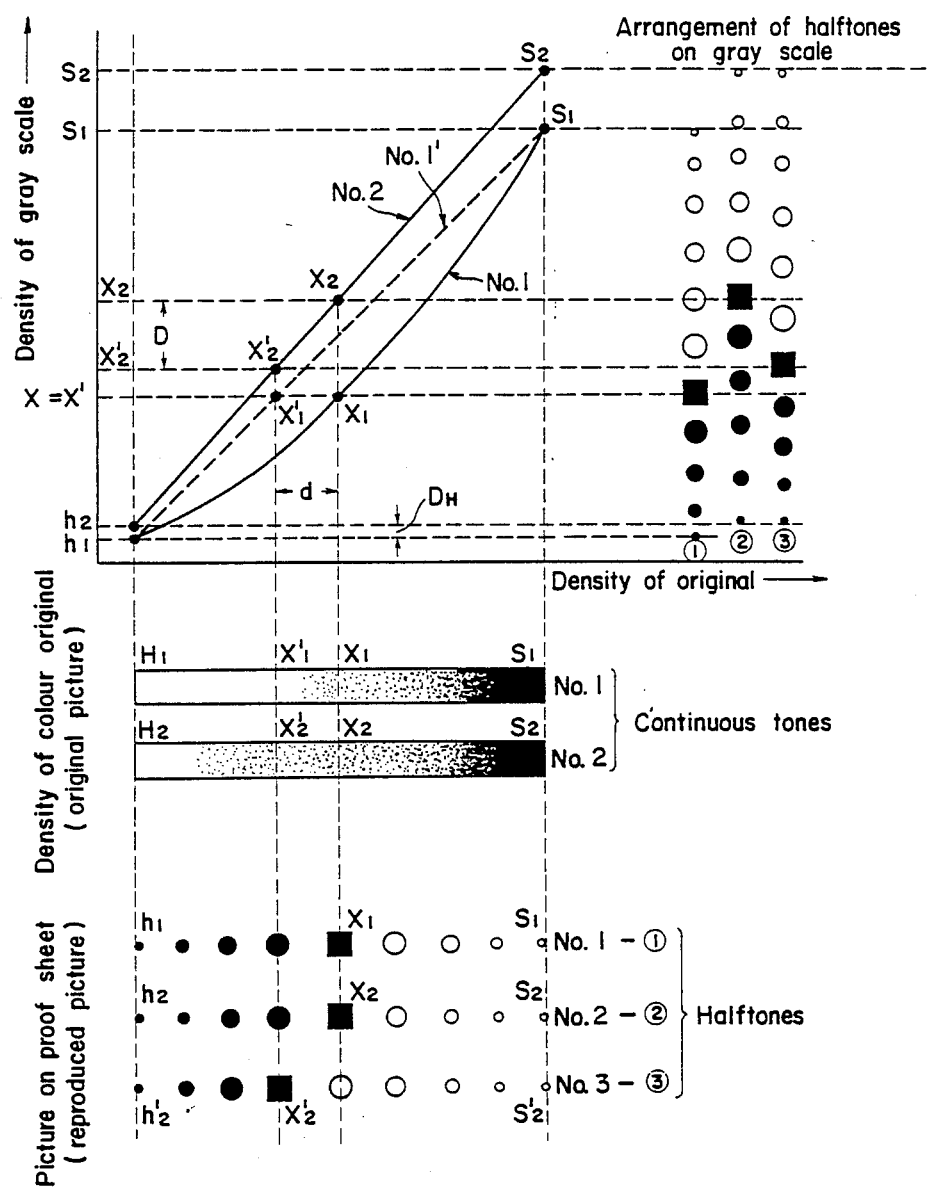
FIG. 3 is a schematic illustration of a relationship between photographing conditions and density characteristic curves of color originals and the setting manner of characteristic curves for color separation.

Photographing Conditions for Color Originals and Experimental Data for Tonal Adjustment and (Control-Separation Characteristic Curves) of Dots in Printed Pictures (See FIG. 3)

| Color Original No. 1 | | Color Original No. 2 | | |
|---|---|---|---|---|
| Density of Color original | $\gamma = 1.00$ Dot gradation (1) Dot area % | Density of Color original | $\gamma = 0.75$ Dot gradation (2) Dot area % | $\gamma = 1.00$ Dot gradation (3) Dot area % |
| 0.170 | 3.0000 | 0.210 | 3.000 | 3.0000 |
| 0.493 | 28.5664 | 0.553 | 24.7260 | 28.5664 |
| 0.815 | 47.7384 | 0.895 | 42.2337 | 47.7384 |
| 1.138 | 62.1155 | 1.238 | 56.3422 | 62.1155 |
| 1.460 | 72.8967 | 1.580 | 67.7114 | 72.8967 |
| 1.783 | 80.9815 | 1.923 | 76.8732 | 80.9815 |
| 2.105 | 87.0443 | 2.265 | 84.2562 | 87.0443 |
| 2.428 | 91.5907 | 2.608 | 90.2057 | 91.5907 |
| 2.750 | 95.0000 | 2.950 | 95.0000 | 95.0000 |

Note:
Density range of Color Original No. 1: 0.17–2.75
Density range of Color Original No. 2: 0.21–2.95

From those experiment, it was found possible to find out a method for determining, more rationally than techniques employed presently, exposure conditions upon photographing of a color original, namely, the density characteristic curve of the color original from the density range of the color original, especially from the density of the its brightest (H) area. This finding also led to the discovery of a method for rationally determining a $\gamma$ value which defines a color-separation characteristic curve useful for color separation of a given color original.

This will next be described with reference to FIG. 3, which schematically illustrates the relationship among photographing conditions for a color original, its density characteristic curve and the manner of setting color-separation characteristic curves.

Firstly, this Example was based on the findings that so long as color-separation work is performed using the formula (1), as substantiated above, the color-separation work can be standardized, the gray balance and color balance are maintained well, a 1:1 correlation exists between the data of the determined color-separation characteristic curve and the quality of the picture of the proof sheet, and when color-separation is conducted by setting the $\gamma$ value for C plate at 0.90–1.00, a proof sheet can be obtained with a picture having the same tone and quality as the picture of the color original When the density characteristic curves of Color Original No. 1 and No. 2 photographed under different exposure conditions are expressed in accordance with the density representation of the gray scale, they can be shown as indicated by No. 1 and No. 2 in FIG. 3. Since the exposure conditions for Color Original No. 2 were appropriate, its density characteristic curve is expressed substantially as a straight line. The density characteristic curve of Color Original No. 1 is however expressed as a curve which is convex downwardly, because of the somewhat excessive exposure.

In actual plate-making work, a gray scale having a straight density gradient is used as a guide for the work whatever color original is subjected to color separation.

In the case of Color Original No. 2 photographed under the appropriate exposure conditions, the density gradient of the gray scale and that of the density characteristic curve of the quality of the color original are both linear. Accordingly, there is fundamentally no problem in the use of a gray scale upon determination of a color-separation characteristic curve.

In the case of Color Original No. 1 on the other hand, the density gradient of the gray scale employed as a guide for color separation work is expressed by a linear density characteristic curve as indicated by the dashed line No. 1'. However, the density gradient of the picture of Color Original No. 1 is expressed by a density characteristic curve indicated by the solid curve No. 1 which is convex downwardly as mentioned above. Accordingly, when conducting color-separation work by using as an original picture a color original other than color originals photographed at the standard exposure levels therefor, it is necessary to determine the density characteristic curve of the color original and further color-separation characteristic curves after rationally and suitably understanding the difference -d between the linear density gradient (No. 1') of the gray scale indicated by the dashed line and the density gradient of the original picture indicated by the solid curve.

When determining what characteristics the density characteristic curve of an original of a non-standard quality, namely, of the picture of a color original having the density characteristic curve of the convex shape shown in FIG. 3 has, the experiences and perception of man have heretofore been relied upon primarily. The above-described rational technical measure for d has not been taken. This is responsible for the instability of color-separation work and also for the instability of reproduced products.

Needless to say, even when each of the H and S areas of one of two original pictures is different in density, density range and the density gradient of density characteristic curve from the corresponding area of the other original picture, it is still possible to obtain their proof sheets with pictures of the same tone and quality provided that a halftone having the same dot area percent is placed at each corresponding areas of the pictures of the proof sheets to be obtained after their color separation. Since the tone of the picture of the proof sheet of Color Original No. 2 is brought into conformity with the tone of the picture of the proof sheet of Color Original No. 1 in this Example, it is only necessary for the pictures of the proof sheets to have Dot Arrangement No. 1-① in the case of Color Original No. 1 and Dot Arrangement No. 2-② in the case of Color Original No. 2.

It should however be taken into mind that when color separation is conducted using an original of non-standard quality (Color Original No. 1) as an original picture while setting the $\gamma$ value for C plate at 1.00 as mentioned above, the density $X_1$ at a desired density point $X_1$ on the original picture becomes a density $X_{1'}$ on a gray scale used as a guide in the color separation. If the color separation work should be conducted without taking into due consideration the difference d between the $X_{1'}$ on the gray scale and the density $X_1$ on the original picture, the color separation work is confused thereby failing to control the quality of a picture to be obtained on a proof sheet.

This matter will be described in detail with reference to FIG. 3. If the halftone of the same dot area percent as the dot area percent of the density point $X_{1'}$ on a gray scale used for Color Original No. 1 is placed at the corresponding density point $X_{2'}$ at the gray scale used for Color Original No. 2, the dot arrangement of the picture on the resulting proof sheet of Color Original No. 2 will be as indicated by No. 2-③ so that the picture will have quality of a darker tone compared with a proof sheet picture of a dot arrangement indicated by No. 1-① or No. 2-②. In order to make equal the tones and qualities of the pictures on both the proof sheets, it is thus necessary to conduct color separation work in the following manner. Taking into consideration the above-described difference d between $X_1$ and $X_{1'}$, a halftone having the same dot area percent as $X_{1'}$ on the gray scale of Original No. 1 is placed for the density $X_2$ higher by D, which corresponds to d, than the density $X_{2'}$ on the gray scale of Original No. 2, said density $X_{2'}$ corresponding to the density $X_{1'}$ on the gray scale of the density $X_1$ in Color Original No. 1. D- is the difference between the density $X_2$ of a density point $X_2$ and the density $X_{2'}$ of the density point $X_{2'}$ mentioned above. At the density point $X_2$, a dot of the same area as the dot obtained at the density point $X_{2'}$ on the gray scale of Color Original No. 2 must be placed to place the same dot as the proof sheet picture of Color Original No. 1 on the proof sheet picture of Color Original No. 2. So long as the color separation work is conducted in accordance with such a density characteristic curve, reproduced pictures having the dot arrangements No. 2- 2 and No. 1- 1 respectively can be obtained with the same tone and quality.

The results of the above experiment are shown in Table 5.

The value $\gamma$, which has been determined to give substantially the same dot area percent for a halftone on the gray scale obtained by conducting color separation of Color Original No. 1 while setting the $\gamma$ value for C plate at 1.00 and for a corresponding halftone on the gray scale obtained by conducting color separation of Color Original No. 2, was 1.00. In that case, the tone of the latter was slightly darker compared to the former. Further, the $\gamma$ value for C plate, which was determined to make the tone and quality of the latter equal to those of the former, was 0.75.

It is possible to rationally determine the shape of a density characteristic curve, which ranges from the H area to the S area of the color original, by conducting such a basic experiment several times on purpose.

It is appreciated that to match the quality of the picture of a proof sheet of Color Original No. 2 with that of the picture of a proof sheet of Color Original No. 1, the $\gamma$ value must be changed from 1.00 to 0.75 and a major cause for the need of a $\gamma$ value change as mentioned above resides in the shape of the density characteristic curve of Color Original No. 1 due to the differences between their exposure conditions described above. It is hence possible to precisely determine the density characteristic curve of a color original provided that an experiment such as that described above is conducted on purpose. In other words, the formula (1) derived in this invention is also useful for the determination of the shape of the density characteristic curve of a color original.

It has also been found through those experiments that the difference between the density characteristic curves of color originals is attributable to the difference in exposure conditions and in order to obtain proof sheet pictures having good quality from color originals obtained under different exposing conditions, the $\gamma$ values have to be determined by correlating them to the exposing conditions. This will next be described on the basis of FIG. 3.

There is the objective fact that the density of the H area (high-light point) of a color original is affected extremely depending whether exposure conditions upon photographing the color original give appropriate exposure, under exposure or over exposure. It is thus only necessary to determine D by estimating the difference d on the basis of the value $D_H = h_2 - h_2$ and then to determine the $\gamma$ value for C plate of Color Original No. 2 in such a way that the dot area percent of a halftone obtained at the density point $X_{1'}$ on the gray scale of Color Original No. 1 may be obtained at the density point $X_2$ on the gray scale of Color Original No. 2.

This shows the manner for determining from the difference in H density ($D_H$) between color originals a $\gamma$ value for obtaining a proof sheet with a picture of good tone and quality.

<Rational method for the determination of $\gamma$ value>

A still further experiment was therefore conducted, in which using various color originals, proof sheet pictures of excellent quality were formed and the relation between the density $H_n$ of the brightest area of each color original and its corresponding $\gamma_n$ value was determined. Data of the experiment are given in Table 6, in which Experiment No. 2 corresponds to an original of standard quality and 0.9 was adopted as $\gamma_n$.

TABLE 6

| Experiment No. | $H_n$ | $S_n$ | Density range | $\gamma_n$ | Quality evaluation |
|---|---|---|---|---|---|
| 1 | 0.12 | 2.80 | 2.68 | 1.60 | Good |
| 2 | 0.20 | 3.00 | 2.80 | 0.90 | Good |
| 3 | 0.50 | 3.10 | 2.60 | 0.05 | Good |

Note: "$H_n$" and "$S_n$" indicate the density of the brightest and darkest areas of each given discrete color original.

From these experiments, $\gamma_n$ values can be determined easily in accordance with the following formulae.

Figure 4:
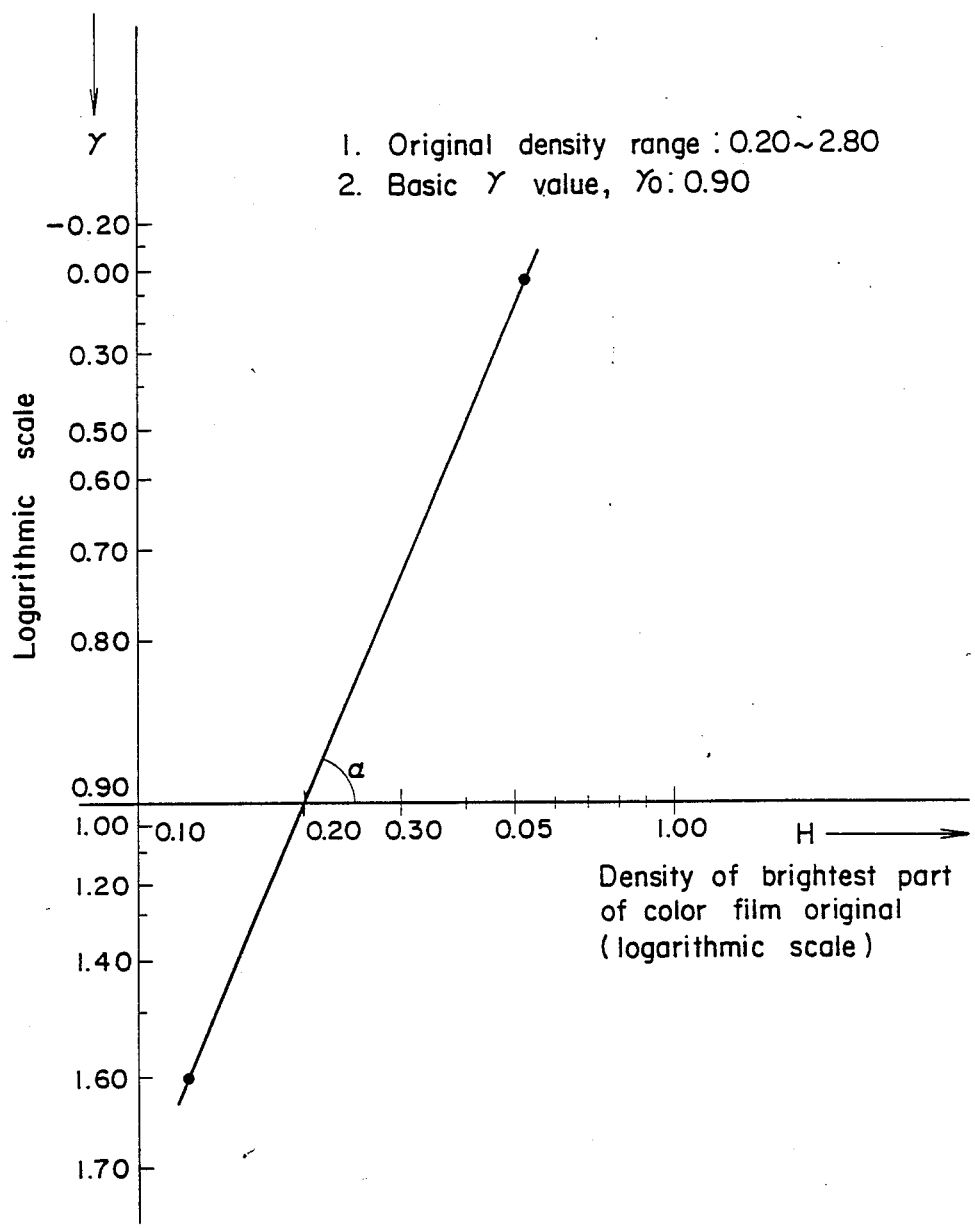
FIG. 4 shows an $H_n$-$\gamma_n$ correlation by using a logarithmic coordinate graph.

(i) When the relation between $\gamma_n$ and $H_n$ in Table 6 is expressed diagrammatically as shown in FIG. 4 (log-log graph), $\gamma n$ can be calculated in accordance with the following formula:

$$\gamma_n = \gamma_o \pm |D_n| \tan \alpha$$

where
$\gamma_o = 0.90$
$D_n = H_n - H_o$
$H_o$ = Density of the brightest area of an original of standard quality. $H_o = 0.2$ in this Experiment.
$\tan \alpha$ = Tangent shown in FIG. 4.
Sign of $\pm = +$ when $H_n > H_o$, and - when $H_n < H_o$.

(ii) Another experiment was also conducted in the following manner. A proof sheet was formed from an original of standard quality (density range: 0.20–2.80) at $Y_o=1.00$. Then, proof sheets of the same picture quality were obtained from various color originals respectively. As a result, it was able to define the relation between $\gamma_n$ and $H_n$ as follows:

(a) $\gamma_n=1.70-2.296l(\log H_n+1)$ (Formula obtained when $\gamma_n$ and $H_n$ are both expressed on logarithmic scale)

(b) $\gamma_n=1.70-2.3(\log H_n+1)$ (Formula obtained when $\gamma_n$ and $H_n$ are expressed on normal scale and logarithmic scale, respectively)

From the foregoing, to form a proof sheet from an original picture whose quality vary widely while assuring excellent reproducibility in both gradation and tone, it is only necessary firstly to determine $\gamma_n$ from the $H_n$ value of the original picture, to use it as a $\gamma$ value for the formula (1) and then to conduct tonal conversion.

We claim:

1. A method for conducting tonal conversion of an original picture based on pictorial information from the original picture upon production of a reproduced picture from the original picture, which comprises converting the base density information datum (x) of a desired control point on the original picture into a halftone intensity (y) at a corresponding control point on the reproduced picture in accordance with the following formula (1):

$$y = y_H + \frac{a(1 - 10^{-kx})}{a - \beta}(y_S - y_H) \quad (1)$$

where x: the base density information datum of the desired control point on the original picture, which is a value obtained by subtracting the density at the brightest area of the original picture from the density at the desired control point of the original picture;

y: the halftone intensity at the corresponding control point on the reproduced picture;

$y_H$: a desired halftone intensity set for the brightest area of the reproduced picture;

$y_S$: a desired halftone intensity set for the darkest area of the reproduced;

$a$: the surface reflectivity of a base material on which the reproduced picture is to be formed;

k: $\gamma$/the density range of the original picture, $\gamma$ being a predetermined factor; and $\beta$: a value determined from the value $\gamma$, which determines k above, in accordance with $\beta = 10^{-\gamma}$.

2. The method as claimed in claim 1, wherein the pictorial information comprises electrical signals converted from density information which have been obtained by photoelectrically scanning the original picture.

3. The method as claimed in claim 1, wherein the halftone intensities (y), ($y_H$) and ($y_S$) are each expressed in terms of dot area percentage.

4. The method as claimed in claim 1, wherein the reproduced picture is a printed picture.

5. The method as claimed in claim 1, wherein the visualizing medium is an ink.

6. The method as claimed in claim 1, wherein the base material is a paper sheet.

7. The method as claimed in claim 1, wherein upon production of the reproduced picture from the original picture, whose brightest area has a density $H_n$, by using the formula (1), a value $\gamma_n$ to be adopted as the value $\gamma$ in the formula (1) is set by determining values $\gamma$ capable of respectively providing reproduced pictures of desired quality from plural original pictures whose brightest areas have different density values H and then setting the value $\gamma_n$ for the value $H_n$ in accordance with a correlation between the density values H and the values $\gamma$.

8. The method as claimed in claim 7, wherein upon determination of the value $\gamma_n$ from the correlation between the values H and the values $\gamma$, values $\gamma$ and values H are plotted on a logarithmic scale along the axis of ordinates and the axis of abscissas respectively, thereby forming a $\gamma$-H rectangular coordinate system, a correlation between values H and empirically-determined values $\gamma$ capable of providing reproduced pictures of desired quality is represented on the coordinate system, and the value $\gamma_n$ corresponding to the value $H_n$ is determined based on the correlation.

9. The method as claimed in claim 7, wherein upon determination of the value $\gamma_n$ from the correlation between the values H and the values $\gamma$, values $\gamma$ and values H are plotted along the axis of ordinates and the axis of abscissas respectively, thereby forming a $\gamma$-H rectangular coordinate system, a correlation between values H and empirically-determined values $\gamma$ capable of providing reproduced pictures of desired quality is represented on the coordinate system, and the value $\gamma_n$ corresponding to the value $H_n$ is determined based on the correlation.

10. The method as claimed in claim 7, wherein upon determination of the value $\gamma_n$ from the correlation between the values H and the values $\gamma$, values $\gamma$ and values H are plotted on a normal scale along the axis of ordinates and on a logarithmic scale along the axis of abscissas respectively, thereby forming a $\gamma$-H rectangular coordinate system, a correlation between values H and empirically-determined values $\gamma$ capable of providing reproduced pictures of desired quality is represented on the coordinate system, and the value $\gamma_n$ corresponding to the value $H_n$ is determined based on the correlation.

* * * * *